United States Patent [19]
Rial

[11] Patent Number: 5,349,997
[45] Date of Patent: Sep. 27, 1994

[54] SYSTEM FOR WATERING INSIDE TREES

[76] Inventor: Craig H. Rial, 906 Seven Oaks Rd., Chester Springs, Pa. 19425

[21] Appl. No.: 149,381

[22] Filed: Nov. 9, 1993

[51] Int. Cl.$^5$ .............................................. A47G 33/12
[52] U.S. Cl. ................................. 141/331; 141/333; 141/334; 141/391; 141/337; 138/155; 47/40.5
[58] Field of Search ............... 141/334, 333, 337, 391, 141/331; 138/155, 120; 47/79, 40.5, 48.5; 285/23; 446/487; 135/74

[56]           References Cited
           U.S. PATENT DOCUMENTS

| | | | |
|---|---|---|---|
| 2,938,304 | 5/1960 | Thomas et al. | 47/40.5 X |
| 3,428,156 | 2/1969 | Charyn et al. | 138/120 |
| 3,669,133 | 6/1972 | Hyman | 135/74 |
| 4,236,711 | 12/1980 | Klingbeil | 135/74 X |
| 4,850,137 | 7/1989 | Foster | 47/40.5 X |
| 4,993,176 | 2/1991 | Spinosa | 47/40.5 |
| 5,076,009 | 12/1991 | Cibor | 47/40.5 |

FOREIGN PATENT DOCUMENTS 123433  8/1900  Fed. Rep. of Germany ...... 138/155

Primary Examiner—Ernest G. Cusick

[57]           ABSTRACT

A portable and highly efficient method for filling the hard to reach watering stands of inside trees, and particularly where the environment or nearby objects are susceptable to damage from splashes or spilled water. The invention is made up of approximately four sections of loosely fitting tubing sections with an angular set funnel at the top, which are held together with a tensioned inside elastic cord, and which can be placed downward through the limbs of an inside tree to quickly feed water from the funnel to the watering stand with a syphon effect generated by the moving water in the full length assembled tubing.

3 Claims, 2 Drawing Sheets

SYSTEM FOR WATERING INSIDE TREES

This invention is in the field of tree watering devices, and, in particular, is a device which circumvents numerous problems that are typically encountered when filling Christmas tree holders with water, when surrounded by wrapped packages, miniature villages, toy trains, etc.

The difficulties in watering large trees with closely spaced low limbs is well known, and a frustration to all who have done it, while attempting to avoid any water damage to surrounding objects or the carpets and floor beneath.

One objective of this invention is to provide a system that makes watering inside trees with a water retaining stand extremely easy; and with little chance of causing water damage to surrounding objects from splashes or spills.

Another objective is to provide a simple portable watering device which can be quickly folded up and reduced in size to become unobtrusive and easy to store for day to day usage during the time that the tree is in place.

It is still another objective to provide a simple system for accurately delivering water to a holding container at the base of a tree, from outside the perimeter of the tree; which allows a wide range of delivery rates, by a syphon action that rapidly draws the water that is poured into the entry point of the system.

It is yet another object of this invention to provide a portable and light weight watering system which, by its quick semi-automatic assembly, requires no instructions for setting up after being folded up and stored from year to year, or between seasons.

The practicability and simplicity of this new invention in obtaining the desired objectives, will be clearly demonstrated with the use of the following figures, operational description, and appended claims:

THE FIGURES

OPERATION DESCRIPTION

Figure 1:
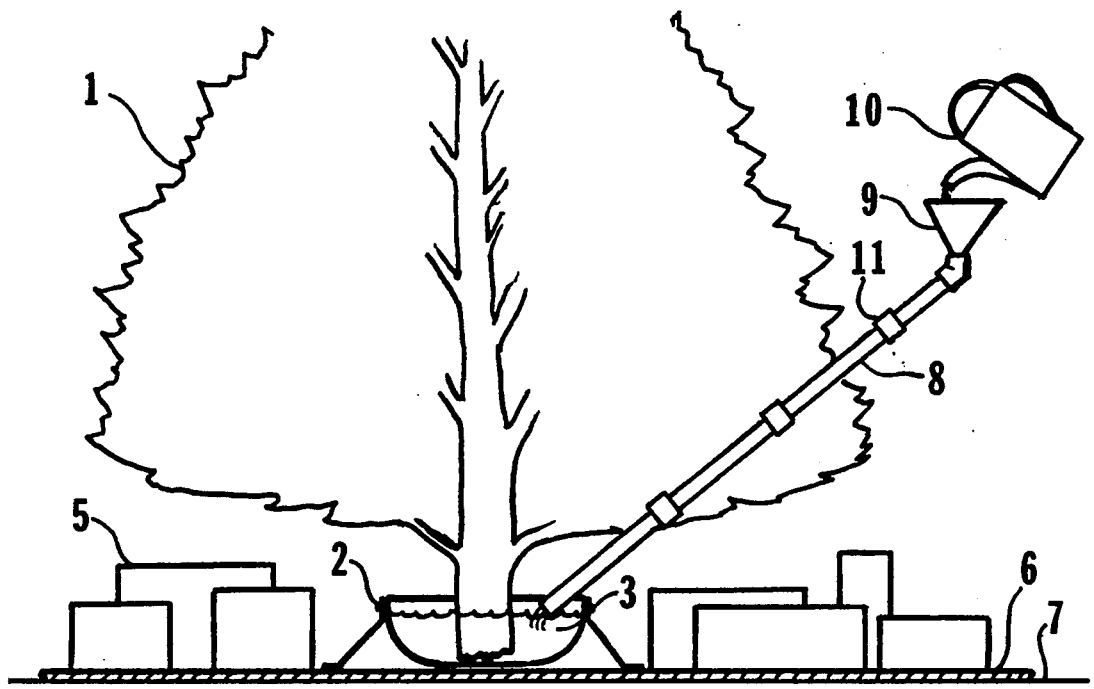
FIG. 1 shows the assembled watering system being used to easily fill a tree watering stand with water, from outside the perimeter of the Christmas tree shown; which penetrates the limb space at about a 45 degree angle, and avoids any surrounding objects at the base of the tree.

FIG. 1 shows the new tree watering system as it would be used with a Christmas tree 1 that is mounted in a tree watering stand 2, which is designed to contain water 3.

The lower branches of the tree 1 are usually quite low, and the base of the tree 4 is usually surrounded by Christmas gift packages 5. There may be some spill protection under the tree watering stand 2; however, any appreciable spill would also reach the carpet 6 and underlying floor 7.

Figure 4:
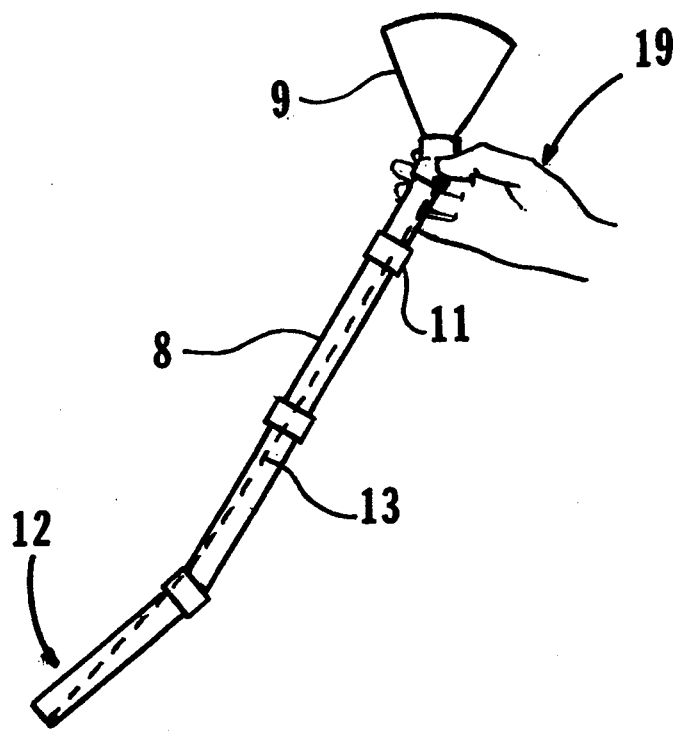
FIG. 4 shows the semi-automatic assembly action, which requires only a quick downward thrust of the wrist to allow the tensioned internal "snap" cord to quickly pull the four segments of the filling tube into place.

The interlocking fill tubes 8 and the angular mounted receiving funnel 9 are made of relatively light materials, such as PVC plastic; as depicted in both FIG. 1 and FIG. 4. The interlocking fill tubes 8 need only be approximately one half inch in width, and the receiving funnel 9 only about four inches in diameter, to accept water quite rapidly from the watering can 10.

There are several natural laws which come into play to make the loosely interlocking design and quick semi-automatic assembly possible. First, the relatively long length of the assembled filling tubes 8 creates a powerful syphon effect when the water starts running and accelerating down the tube, which literally "sucks" the water from the receiving funnel 9 as quickly as it is poured from the watering can 10; which covers a wide breadth of possible operator misjudgement.

In addition, the relatively loose tube couplings 11, at the junctions of the interlocking fill tubes 8, are necessary for the "snap" action 12 of the separate lengths of interlocking tubes 8, when quickly drawn together by the snap cord 13 that runs through the interlocking tubes 8, and is fastened under tension at both ends of the tubing assembly. Refer to FIG. 4, which demonstrates this action.

Figure 5:
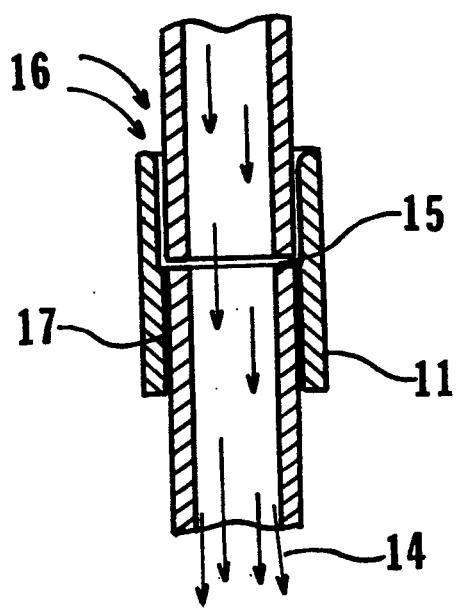
FIG. 5 shows a coupling section, to illustrate the syphon like effect of the water rushing down the inclined filling tube, which not only draws water down the long tube very quickly, but causes air to be drawn into the loosely fitting overlap couplings; which, in turn, avoids leakage of water from the necessarily loose fittings.

With reference to FIG. 5, fill water 14 would normally be expected to leak out around the relatively loose overlapping couplings 11; however, the water 14, as it rushes past the cracks between the tube ends 15, causes a drawing effect, which tends to draw air 16 from the outside into the tubing assembly 8; thus preventing leakage while the fill water 14 is rapidly running through the tubing assembly 8.

The overlapping tube couplings 11 are welded 17 to the upper ends of each of the fill tubes 8; however, the top of the tube couplings 11 are loosely fit to the fill tubes 8, to allow the semi-automatic snap action assembly 12 that is provided by the inside snap cord 13, with a short downward thrust of the assemblers wrist 19; as shown in FIG. 4.

Everyone has experienced the frustration of trying to assemble appliances with inadequate instructions, or worst still, without instructions that have been lost. Since the new tree watering invention and break down design is aimed at long life over many years of Christmas holidays, it is important that no instructions be required for quick assembly.

Removing the need for any instructions is accomplished with semi-automatic assembly, by the inside snap cord 13 that runs through all of the fill tube segments 8 and is fastened under tension at both ends; to quickly draw all parts together with a "snap" into place action 12, as shown by FIG. 4.

Figure 2:
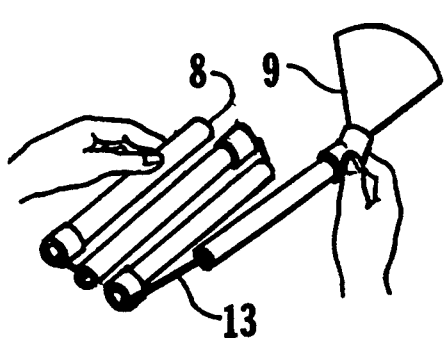
FIG. 2 shows the portable watering system when disassembled, after being removed from its storage box, or in preparation to being stored in the storage box.
Figure 3:
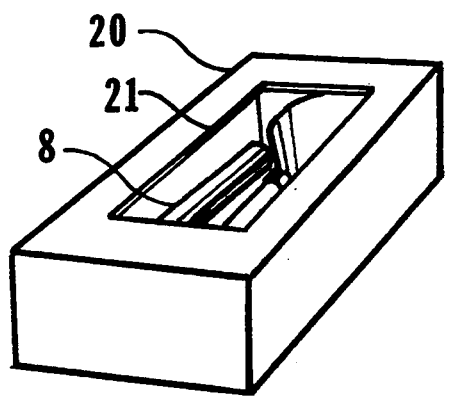
FIG. 3 shows a storage box for the invention which reveals the interconnected four piece unit through a cut out window, which makes the unit easily identified when stored from year to year.

FIG. 2 and FIG. 3 show the relationship between the folded up watering assembly 22 and a reusable storage box 20 that is provided. A cut out window 21 in the storage box 20 helps to locate the watering assembly 22 after yearly storage. The snap cord 13, as shown in FIG. 2, tends to hold the folded tubing sections 8 together while in the folded condition shown, prior to repacking in the container 20; as shown in FIG. 3.

SUMMARY

The economical new tree watering invention fills all of the desired objectives, while featuring easy breakdown and assembly, for daily use during the season for inside trees; easy storage between the yearly usage; and quick reassembly by any person, without instructions.

I claim:

1. An economical watering system for easily filling tree watering stands from outside the perimeter of the tree without the danger of spilling water on valuable packages or the floor and floor coverings that are generally beneath said tree watering stands; comprising a multi-segment tube having individual tube segments each with one end having an overlapping tubular coupling which when coupled at said couplings form a water delivery tube assembly that is approximately three to four feet in length adapted to penetrate through the limbs of said tree to deliver water to said watering stand at the base of said tree;

an elastic cord inside said tube assembly;

said multiple segment tube held together by said elastic cord which runs through the inside of said segments, and said cord is fastened under tension at both ends of said multi-segment tube so as to draw and hold together said segments and said overlapping tube couplings;

said overlapping tube couplings having a diameter sized when said coupling interconnects with a respective other end of a segment to avoid frictional interference when said multiple tube segments are being held by said elastic cord;

a receiving funnel;

said outermost end segment of said multiple tube segments having said receiving funnel with said funnel mounted at a 45 degree angle to said outermost end segment to make said receiving funnel near vertical and said funnel adapted to receive water after the entire watering assembly is placed between the tree limbs at approximately a 45 degree angle to the tree trunk, and directing water to the watering stand at the base of said tree.

2. The system of claim 1 wherein the multiple segment tube assembly may be separated and the segments folded side by side while still held together by said elastic cord which runs through the inside of said tube segments to permit the system to be folded into a small bundle that may be easily placed in a box for storage.

3. The system of claim 2 wherein the said elastic cord which runs through the inside of said multiple tube segments maintains the sequence of assembly and permits said multiple tube segments to be snapped together as a single tube and receiving funnel assembly.

* * * * *